United States Patent
Lasserre et al.

(10) Patent No.: US 9,924,178 B2
(45) Date of Patent: *Mar. 20, 2018

(54) METHOD AND DEVICE FOR ENCODING A HIGH-DYNAMIC RANGE IMAGE AND/OR DECODING A BITSTREAM

(71) Applicant: THOMSON LICENSING, Issy les Moulineaux (FR)

(72) Inventors: Sebastien Lasserre, Thorigné Fouillard (FR); Yannick Olivier, Thorigne Fouillard (FR); Fabrice Le Leannec, Mouaze (FR); David Touze, Rennes (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/108,556

(22) PCT Filed: Dec. 22, 2014

(86) PCT No.: PCT/EP2014/078942
§ 371 (c)(1),
(2) Date: Jun. 27, 2016

(87) PCT Pub. No.: WO2015/097120
PCT Pub. Date: Jul. 2, 2015

(65) Prior Publication Data
US 2016/0330456 A1    Nov. 10, 2016

(30) Foreign Application Priority Data

Dec. 27, 2013 (EP) .................................... 13306878

(51) Int. Cl.
*H04N 19/184* (2014.01)
*H04N 19/30* (2014.01)
(Continued)

(52) U.S. Cl.
CPC ......... *H04N 19/184* (2014.11); *G06T 1/0007* (2013.01); *G09G 3/3426* (2013.01);
(Continued)

(58) Field of Classification Search
CPC .... H04N 19/184; H04N 19/30; H04N 19/186; H04N 19/61; H04N 19/85; H04N 19/36;
(Continued)

(56) References Cited

U.S. PATENT DOCUMENTS

| | | | |
|---|---|---|---|
| 8,606,009 B2* | 12/2013 | Sun | ........................... G06T 5/50 345/589 |
| 2007/0201560 A1* | 8/2007 | Segall | .................... H04N 19/61 375/240.24 |

(Continued)

FOREIGN PATENT DOCUMENTS

| | | |
|---|---|---|
| EP | 2375383 | 10/2011 |
| WO | WO2011163114 | 12/2011 |

OTHER PUBLICATIONS

Mai, et al: "Optimizing a tone curve for backward-compatible high dynamic range image and video compression", IEEE, 2011.*

(Continued)

*Primary Examiner* — Ruiping Li
(74) *Attorney, Agent, or Firm* — Brian J. Dorini; Ronald J. Kolczynski

(57) ABSTRACT

The present invention generally relates to a method and device for encoding an image. The method comprises: —encoding (12) a backlight image determined (11) from the image; —obtaining (13) a residual image by dividing the image by a decoded version of the backlight image, —obtaining (16) a tone-mapped residual image by tone-mapping the residual image; and —encoding (19) the tone-mapped residual image. The invention relates also to a method and (Continued)

device for decoding a bitstream representing a residual image calculated by dividing an image by a backlight image.

15 Claims, 2 Drawing Sheets

(51) Int. Cl.
  *G09G 3/34* (2006.01)
  *H04N 19/186* (2014.01)
  *G06T 1/00* (2006.01)

(52) U.S. Cl.
  CPC ........... *H04N 19/186* (2014.11); *H04N 19/30* (2014.11); *G09G 2320/0646* (2013.01); *G09G 2340/02* (2013.01); *G09G 2350/00* (2013.01); *G09G 2360/16* (2013.01)

(58) Field of Classification Search
  CPC ............... G06T 1/0007; G09G 3/3426; G09G 2320/0646; G09G 2320/066; G09G 2340/02; G06F 3/14
  See application file for complete search history.

(56) References Cited

U.S. PATENT DOCUMENTS

2010/0046612 A1    2/2010  Sun et al.
2011/0194618 A1*   8/2011  Gish .................. G06T 5/50
                                             375/240.25

OTHER PUBLICATIONS

Firas et al., "High Throughput JPEG2000 Compatible Encoder for High Dynamic Range Images", IEEE International Conference on Image Processing, San Diego, California, USA, Oct. 12, 2008, pp. 1424-1427.

Mantiuk, R., "Multidimensional retargeting: Tone Mapping", ACM Siggraph ASIA 2011 Courses: Multidimensional image Retargeting, Hong Kong, Dec. 1, 2011, pp. 1-75.

Takao et al., "High Contrast HDR Video Tone Mapping Based on Gamma Curves", Institute of Electronics, Information and Communications Engineers Transactions on Fundamentals of Electronics, Communications and Computer Sciences, vol. E94A, No. 2, Feb. 2011, pp. 525-532.

Takao et al., "New Local Tone Mapping and Two-Layer Coding for HDR Images", 2012 IEEE International Conference on Acoustics, Speech and Signal Processing, Kyoto, Japan, Mar. 25, 2012, pp. 765-768.

Touze et al., "High Dynamic Range Video Distribution Using Existing Video Codecs", 2013 Picture Coding Symposium (PCS), San Jose, California, USA, Dec. 8, 2013, pp. 349-352.

Salih et al., "Tone Mapping of HDR images: A review", IEEE International Conference on Intelligent and Advanced Systems, Kuala Lumpur, Malaysia, Jun. 12, 2012, pp. 368-373.

Shiau et al., "High Dynamic Range Image Rendering With Order-Statistics Filter", IEEE International Conference on Genetic and Evolutionary Computing, Kitakyushu, Japan, Aug. 25, 2012, pp. 352-355.

Anonymous, "Advanced Video Coding for Generic Audiovisual Services", ITU Telecommunication Standardization Sector H.264, Series H: Audiovisual and Multimedia Systems, Infrastructure of audiovisual services—Coding of moving video, Jan. 2012, pp. 1-680.

Lasserre et al., "High Dynamic Range Video Coding", 16th Joint Collaborative Team on Video Coding Meeting, San Jose, California, USA, Jan. 2014, pp. 1-11.

Touze et al., "HDR Video Coding based on Local LDR Quantization", HDRi2014—Second International Conference SME Workshop on HDR imaging, Mar. 4, 2014, pp. 1-6.

Basse et al., "Proposed Standardization of XYZ Image", ISO/IEC JTC1/SC29/WG11 MPEG2013/M30167, Vienna, Austria, Jul. 2013, pp. 1-2.

* cited by examiner

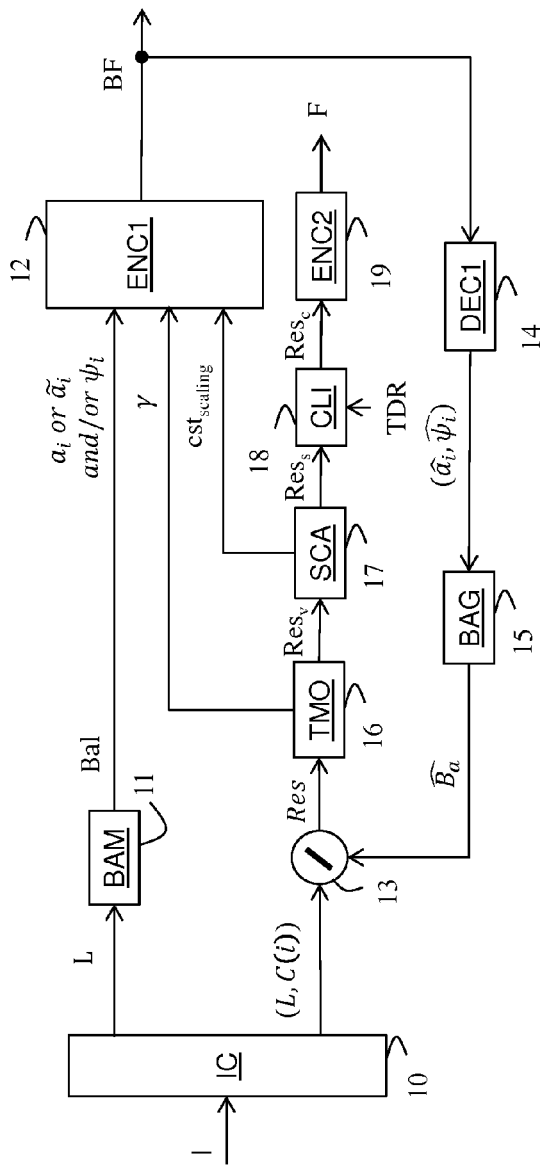
Fig. 1
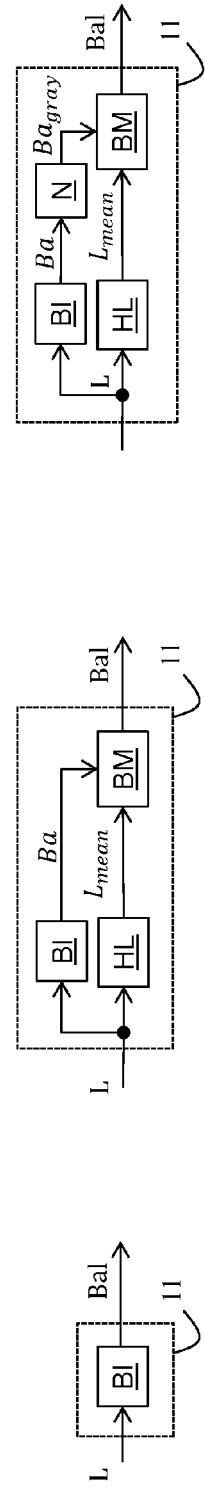
Fig. 4
Fig. 3
Fig. 2

METHOD AND DEVICE FOR ENCODING A HIGH-DYNAMIC RANGE IMAGE AND/OR DECODING A BITSTREAM

This application claims the benefit, under 35 U.S.C. § 365 of International Application of PCT/EP2014/078942, filed Dec. 22, 2014, which was published in accordance with PCT Article 21(2) on Jul. 2, 2015, in English, and which claims the benefit of European patent application No. 13306878.3, filed Dec. 27, 2013.

FIELD OF INVENTION

The present invention generally relates to image/video encoding and decoding. In particular, the technical field of the present invention is related to encoding/decoding of an image whose pixels values belong to a high-dynamic range.

TECHNICAL BACKGROUND

The present section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Low-Dynamic-Range images (LDR images) are images whose luminance values are represented with a limited number of bits (most often 8 or 10). This limited representation does not allow correct rendering of small signal variations, in particular in dark and bright luminance ranges. In high-dynamic range images (HDR images), the signal representation is extended in order to maintain a high accuracy of the signal over its entire range. In HDR images, pixel values are usually represented in floating-point format (either 32-bit or 16-bit for each component, namely float or half-float), the most popular format being openEXR half-float format (16-bit per RGB component, i.e. 48 bits per pixel) or in integers with a long representation, typically at least 16 bits.

A typical approach for encoding an HDR image is to reduce the dynamic range of the image in order to encode the image by means of a traditional encoding scheme (initially configured to encode LDR images).

According to a first approach, a tone-mapping operator is applied to the input HDR image and the tone-mapped image is then encoded by means of a traditional 8-10 bit depth encoding scheme such as JPEG/JPEG200 or MPEG-2, H.264/AVC for video ("*Advanced video coding for generic audiovisual Services*", SERIES H: AUDIOVISUAL AND MULTIMEDIA SYSTEMS, Recommendation ITU-T H.264, Telecommunication Standardization Sector of ITU, January 2012). Then, an inverse tone-mapping operator is applied to the decoded image and a residual image is calculated between the input image and the decoded and inverse-tone-mapped image. Finally, the residual image is encoded by means of a second traditional 8-10 bit-depth encoder scheme.

This first approach is backward compatible in the sense that a low dynamic range image may be decoded and displayed by means of a traditional apparatus.

However, this first approach uses two encoding schemes and limits the dynamic range of the input image to be twice the dynamic range of a traditional encoding scheme (16-20 bits). Moreover, such approach leads sometimes to a low dynamic range image with a weaker correlation with the input HDR image. This leads to low coding performance of the image.

According to a second approach, a backlight image is determined from the luminance component of the input HDR image. A residual image is then obtained by dividing the input HDR image by the backlight image and both the backlight image and the residual image are directly encoded.

This specific approach for encoding an input HDR image is not backward compatibility with a traditional apparatus which is not able to decode and/or display a high dynamic range.

SUMMARY OF THE INVENTION

The invention sets out to remedy some of the drawbacks of the prior art with a method for encoding an image comprising:
  encoding a backlight image determined from the image;
  obtaining a residual image by dividing the image by a decoded version of the backlight image,
  obtaining a tone-mapped residual image by tone-mapping the residual image; and
  encoding the tone-mapped residual image.

This provides a viewable residual image, i.e. a residual image in the sense that resulting residual image renders artistically the tone-mapped scene reasonably well and consistently compared to the original scene in the image. This method is thus backward compatible because the viewable residual image may be decoded and/or displayed by a traditional apparatus which is not able to handle high dynamic range.

Moreover, encoding a high dynamic range image by means of such method leads to an efficient encoding scheme because the tone-mapped residual image (low dynamic range image), which is highly spatially correlated (and temporally correlated with other images of a same sequence of images), and the backlight image are encoded separately. A coding gain is thus reached because of the high compression rate of the tone-mapped residual image and of the little amount of data to encode the backlight image.

According to an embodiment, tone-mapping the residual image comprises either a gamma correction or a SLog correction according to the pixel values of the residual image.

Gamma and SLog corrections, such that there is no loss of dark and bright information, lead to the reconstruction of an HDR image, from the residual image and the backlight image, with high precision. Moreover, gamma and S-log correction avoid flat clipped areas in both the reconstructed HRD image and the viewable residual image.

According to an embodiment, obtaining the backlight image from the image comprises:
  obtaining a backlight image from a luminance component of the image; and
  modulating the backlight image with a mean luminance value of the image.

Modulating the backlight image with a mean luminance value of the image improves the global luminance coherence between the image and the residual image, e.g. a bright region in the image appears bright in the residual image and a dark region in the image appears dark in the residual image.

According to an embodiment, obtaining the backlight image from the image further comprises:

normalizing the backlight image by its mean value before modulating the backlight image.

This allows to get a mid-gray-at-one backlight image for the image.

According to an embodiment, the method further comprises scaling of the residual image before encoding.

This put the mean gray of an image obtained from the residual image at an adequate value for both viewing and coding.

According to an embodiment, the method further comprises clipping the residual image before encoding.

Clipping the residual image ensures a limited number of bits and allows the use of a traditional encoding/decoding scheme for encoding it. Also, the encoding/decoding scheme is backward compatible with existing infrastructure (codec, displays, distribution channels, etc.) because only the residual image, which has a low dynamic range, typically 8-10 bits, may be transmitted over such infrastructure to display a low dynamic range version of the image. The small bit-stream, which contains the backlight data, may be carried in a side container over a dedicated infrastructure to distribute the original version of the image (i.e. a HDR image).

According to another of its aspects, the invention relates to a method for decoding an image from a bitstream comprising:
obtaining a backlight image and a decoded residual image by a at least partially decoding of the bitstream, and
obtaining a decoded image by multiplying the decoded residual image by the backlight image;
characterized in that the decoded residual image is inverse-tone-mapped before multiplying the decoded residual image by the backlight image.

According to another of its aspects, the invention relates to a device for encoding an image and a device for decoding a bitstream which implements the above methods.

The specific nature of the invention as well as other objects, advantages, features and uses of the invention will become evident from the following description of a preferred embodiment taken in conjunction with the accompanying drawings.

LIST OF FIGURES

The embodiments will be described with reference to the following figures:

FIG. 1 shows a block diagram of the steps of a method for encoding an image I in accordance with an embodiment of the invention;

FIG. 2 shows a block diagram of a step of the method in accordance with an embodiment of the invention;

FIG. 3 shows a block diagram of a step of the method in accordance with an embodiment of the invention;

FIG. 4 shows a block diagram of a step of the method in accordance with an embodiment of the invention;

DETAILED DESCRIPTION OF PREFERRED EMBODIMENTS OF THE INVENTION

Figure 5:
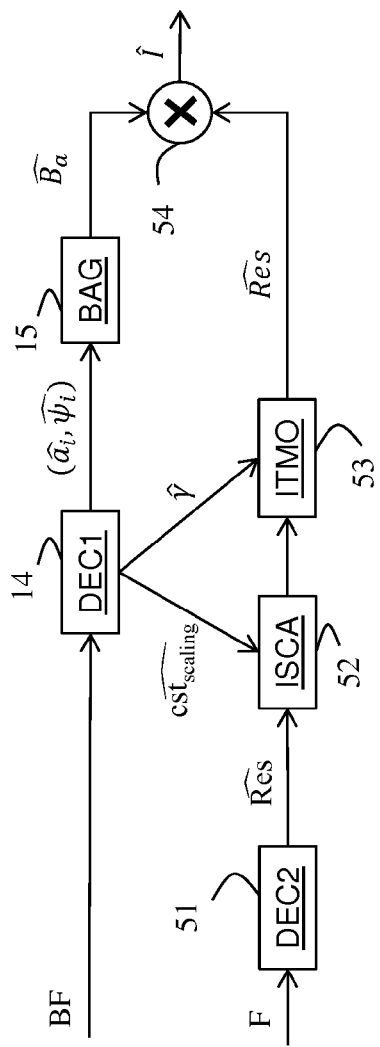
FIG. 5 shows a block diagram of the steps of a method, in accordance with an embodiment of the invention, for decoding a bitstream representing a residual image calculated by dividing an image by a backlight image.

The present invention will be described more fully hereinafter with reference to the accompanying figures, in which embodiments of the invention are shown. This invention may, however, be embodied in many alternate forms and should not be construed as limited to the embodiments set forth herein. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "one embodiment" or "an embodiment" means that a particular feature, structure, or characteristic described in connection with the embodiment can be included in at least one implementation of the invention. The appearances of the phrase "in one embodiment" or "according to an embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

While not explicitly described, the present embodiments and variants may be employed in any combination or sub-combination.

The invention is described for encoding/decoding an image but extends to the encoding/decoding of a sequence of images (video) because each image of the sequence is sequentially encoded/decoded as described below.

FIG. 1 shows a block diagram of the steps of a method for encoding an image I in accordance with an embodiment of the invention.

In step 10, a module IC obtains the luminance component L and potentially at least one color component C(i) of the image I to be encoded.

For example, when the image I belongs to the color space (X,Y,Z), the luminance component L is obtained by a transform f(.) of the component Y, e.g. L=f(Y).

When the image I belongs to the color space (R,G,B), the luminance component L is obtained, for instance in the 709 gamut, by a linear combination which is given by:

$$L=0.2127.R+0.7152.G+0.0722.B$$

In step 11, a module BAM determines a backlight image Bal from the luminance component L of the image I.

According to an embodiment of the step 11, illustrated in FIG. 2, a module BI determines a backlight image Ba as being a weighted linear combination of shape functions $\psi_i$ given by:

$$Ba = \Sigma_i a_i \psi_i \quad (1)$$

with $a_i$ being weighting coefficients.

Thus, determining a backlight image Ba from a luminance component L consists in finding optimal weighting coefficients (and potentially also optimal shape functions if not known beforehand) in order that the backlight image Ba fits the luminance component L.

There are many well-known methods to find the weighting coefficients $a_i$. For example, one may use a least mean square method to minimize the mean square error between the backlight image Ba and the luminance component L.

The invention is not limited to any specific method to obtain the backlight image Ba.

It may be noted that the shape functions may be the true physical response of a display backlight (made of LED's for instance, each shape function then corresponding to the response of one LED) or may be a pure mathematical construction in order to fit the luminance component at best.

According to this embodiment, the backlight image Bal, output from step 11, is the backlight image Ba given by equation (1).

According to an embodiment of the step 11, illustrated in FIG. 3, a module BM modulates the backlight image Ba (given by equation (1)) with a mean luminance value $L_{mean}$ of the image I obtained by the means of a module HL.

According to this embodiment, the backlight image Bal, output from step 11, is the modulated backlight image.

According to an embodiment, the module HL is configured to calculate the mean luminance value $L_{mean}$ over the whole luminance component L.

According to an embodiment, the module HL is configured to calculate the mean luminance value $L_{mean}$ by $$L_{mean} = E(L^\beta)^{\frac{1}{\beta}}$$

with $\beta$ being a coefficient less than 1 and E(X) the mathematical expectation value (mean) of the luminance component L.

This last embodiment is advantageous because it avoids that the mean luminance value $L_{mean}$ be influenced by a few pixels with extreme high values which usually leads to very annoying temporal mean brightness instability when the image I belongs to a sequence of images.

The invention is not limited to a specific embodiment for calculating the mean luminance value $L_{mean}$.

According to a variant of this embodiment, illustrated in FIG. 4, a module N normalizes the backlight image Ba (given by equation (1)) by its mean value E(Ba) such that one gets a mid-gray-at-one backlight image $Ba_{gray}$ for the image (or for all images if the image I belongs to a sequence of images):

$$Ba_{gray} = \frac{Ba}{E(Ba)}$$

Then, the module BM is configured to modulate the mid-gray-at-one backlight image $Ba_{gray}$ with the low-spatial-frequency version $L_{lf}$ of the image L, by using the following relation $$Ba_{mod} \approx cst_{mod} \cdot L_{lf}^\alpha \cdot Ba_{gray} \quad (2)$$

with $cst_{mod}$ being a modulation coefficient and $\alpha$ being another modulation coefficient less than 1, typically ⅓.

According to this variant, the backlight image Bal, output from step 11, is the modulated backlight image $Ba_{mod}$ given by equation (2).

It may be noted that the modulation coefficient $cst_{mod}$ is tuned to get a good looking brightness for the residual image and highly depends on the process to obtain the backlight image. For example, $cst_{mod} \approx 1.7$ for a backlight image obtained by least means squares.

Practically, by linearity, all operations to modulate the backlight image apply to the backlight coefficients $a_i$ as a correcting factor which transforms the coefficients $a_i$ into new coefficients $\tilde{a}_i$ such that one gets $$Ba_{mod} = \sum_i \tilde{a}_i \psi_i$$

In step 12, the data needed to determine the backlight image Bal, output from step 11, are encoded by means of an encoder ENC1 and added in a bitstream BF which may be stored on a local or remote memory and/or transmitted through a communication interface (e.g. to a bus or over a communication network or a broadcast network).

For example, the data to be encoded are limited to the weighting coefficients $a_i$ or $\tilde{a}_i$ when known non-adaptive shape functions are used, but the shape functions $\psi_i$ may also be a priori unknown and then encoded in the bitstream BF, for instance in a case of a somewhat optimal mathematical construction for better fitting. So, all the weighting coefficients $a_i$ or $\tilde{a}_i$ (and potentially shape functions $\psi_i$) are encoded in the bitstream BF.

Advantageously, the weighting coefficients $a_i$ or $\tilde{a}_i$ are quantized before encoded in order to reduce the size of the bitstream BF.

In step 13, a residual image Res is calculated by dividing the image by a decoded version $\widehat{Ba}$ of the backlight image.

It is advantageous to use the decoded version $\widehat{Ba}$ of the backlight image to ensure a same backlight image on both encoder and decoder side, thus leading to a better precision of a final decoded image $\hat{I}$.

More precisely, the luminance component L and potentially each colour component C(i) of the image I, obtained from the module IC, is divided by the decoded version $\widehat{Ba}$ of the backlight image. This division is done pixel per pixel.

For example, when the components R, G or B of the image I are expressed in the color space (R,G,B), the component $R_{Res}$, $G_{Res}$ and $B_{Res}$ are obtained as follows:

$$R_{res}=R/\widehat{Ba}, G_{res}=G/\widehat{Ba}, B_{res}=B/\widehat{Ba}.$$

For example, when the components X, Y or Z of the image I are expressed in the color space (Y,Y,Z), the component $X_{Res}$, $Y_{Res}$ and $Z_{Res}$ are obtained as follows:

$$X_{res}=X/\widehat{Ba}\ Y_{res}=Y/\widehat{Ba}\ Z_{res}=Z/\widehat{Ba}$$

According to an embodiment, in step 14, the decoded version $\widehat{Ba}$ of the backlight image is obtained by decoding at least partially the bitstream BF by means of a decoder DEC1.

As explained before, some data needed to obtain the backlight image, output of step 11, have been encoded (step 12) and then obtained by at least partially decoding the bitstream BF.

Following the example given above, weighting coefficients $\hat{a}_i$ (and potentially shape functions $\widehat{\psi_i}$) are then obtained as output of step 14.

Then, in step 15, a module BAG generates a decoded version $\widehat{Ba}$ of the backlight image from the weighting coefficients $\hat{a}_i$ and either some known non-adaptive shape functions or the shape functions $\widehat{\psi_i}$ by:

$$\widehat{Ba}=\Sigma_i\hat{a}_i\widehat{\psi_i}$$

In step 16, a module TMO tone-maps the residual image Res in order to get a viewable residual image $Res_v$.

It may appear that the residual image Res may not be viewable because its dynamic range is too high and because a decoded version of this residual image Res shows too visible artifacts. Tone-mapping the residual image remedies to at least one of these drawbacks.

The invention is not limited to any specific tone-mapping operator. This single condition is that the tone-mapping operator shall be reversible.

For example, the tone-mapping operator defined by Reinhard may be used (Reinhard, E., Stark, M., Shirley, P., and Ferwerda, J., \Photographic tone reproduction for digital images," ACM Transactions on Graphics 21 (July 2002)), or Boitard, R., Bouatouch, K., Cozot, R., Thoreau, D., & Gruson, A. (2012). Temporal coherency for video tone mapping. In A. M. J. van Eijk, C. C. Davis, S. M. Hammel, & A. K. Majumdar (Eds.), Proc. SPIE 8499, *Applications of Digital Image Processing* (p. 84990D-84990D-10)).

In step 19, the viewable residual image $Res_v$ is encoded by means of an encoder ENC2 in a bitstream F which may be stored on a local or remote memory and/or transmitted through a communication interface (e.g. on a bus or over a communication network or a broadcast network).

According to an embodiment of the step 16, tone mapping the residual image comprises either a gamma correction or a SLog correction according to the pixel values of the residual image.

The viewable residual image $Res_v$ is then given, for example, by:

$$Res_v=A.Res^\gamma$$

with A being a constant value, γ being a coefficient of a gamma curve equal, for example, to 1/2.4.

Alternatively, the viewable residual image $Res_v$ is given, for example, by:

$$Res_v=a.\ln(Res+b)+c$$

with a,b and c being coefficients of a SLog curve determined such that 0 and 1 are invariant, and the derivative of the SLog curve is continuous in 1 when prolonged by a gamma curve below 1. Thus, a,b and c are functions of the parameter γ.

According to an embodiment, the parameter γ of the gamma-Slog curve is encoded in the bitstream BF.

Applying a gamma correction on the residual image Res, pulls up the dark regions but does not lower enough high lights to avoid burning of bright pixels.

Applying a SLog correction on the residual image Res lowers enough high lights but does not pull up the dark regions.

Then, according to a preferred embodiment of the step 16, the module TMO applies either the gamma correction or the SLog correction according to the pixel values of the residual image Res.

For example, when the pixel value of the residual image Res is below a threshold (equal to 1), then the gamma correction is applied and otherwise the SLog correction is applied.

By construction, the viewable residual image $Res_v$ usually has a mean value more or less close to 1 depending on the brightness of the image I, making the use of the above gamma-Slog combination particularly efficient.

According to an embodiment of the method, in step 17, a module SCA scales the viewable residual image $Res_v$ before encoding (step 19) by multiplying each component of the viewable residual image $Res_v$ by a scaling factor $cst_{scaling}$. The resulting residual image $Res_s$ is then given by $$Res_s=cst_{scaling}.Res_v$$

In a specific embodiment, the scaling factor $cst_{scaling}$ is defined to map the values of the viewable residual image $Res_v$ between from 0 to the maximum value $2^N-1$, where N is the number of bits allowed as input for the coding by the encoder ENC2.

This is naturally obtained by mapping the value 1 (which is roughly the mean value of the viewable residual image $Res_v$) to the mid-gray value $2^{N-1}$. Thus, for a viewable residual image $Res_v$ with a standard number of bits N=8, a scaling factor equal to 120 is a very consistent value because very closed to the neutral gray at $2^7=128$.

According to this embodiment of the method, in step 19, the residual image $Res_s$ is encoded by means of an encoder ENC2.

According to an embodiment of the method, in step 18, a module CLI clips the viewable residual image $Res_v$ before encoding to limit its dynamic range to a targeted dynamic range TDR which is defined, for example, according to the capabilities of the encoder ENC2.

According to this last embodiment, the resulting residual image $Res_c$ is given, for example, by:

$$Res_c=\max(2^N,Res_v)$$

$$Res_c=\max(2^N,Res_s)$$

according to the embodiments of the method.

The invention is not limited to such clipping (max(.)) but extends to any kind of clipping.

According to this embodiment of the method, in step 19, the residual image $Res_c$ is encoded by means of an encoder ENC2.

Combining the scaling and clipping embodiments leads to a residual image $Res_{sc}$ given by:

$$Res_{sc} = \max(2^N, cst_{scaling} * Res_v)$$

or by $Res_{sc} = \max(2^N, cst_{scaling} * Res_s)$ according to the embodiments of the method.

According to this embodiment of the method, in step 19, the residual image $Res_{sc}$ is encoded by means of an encoder ENC2.

The tone-mapping and scaling of the viewable residual image $Res_v$ is a parametric process. The parameters may be fixed or not and in the latter case they may be encoded in the bitstream BF by means of the encoder ENC1.

According to an embodiment of the method, the constant value γ of the gamma correction, the scaling factor $cst_{scaling}$ may be parameters which are encoded in the bitstream BF.

It may be noted that the choice of the parameters α, $cst_{mod}$, $cst_{scaling}$, γ, β gives room for the choice of the tone-mapping which suits the content the best following the taste of an expert in post-production and color grading.

On the other hand, universal parameters may be defined in order to be acceptable for all of a large variety of images. Then, no parameters are encoded in the bitstream BF.

FIG. 5 shows a block diagram of the steps of a method, in accordance with an embodiment of the invention, for decoding a bitstream representing a residual image calculated by dividing an image by a backlight image.

As explained above, in steps 14 and 15, a backlight image $\widehat{Ba}$ is obtained for example by at least partially decoding a bitstream BF by means of the decoder DEC1.

The bitstream BF may have been stored locally or received from a communication network.

In step 51, a decoded residual image $\widehat{Res}$ is obtained by a at least partial decoding of a bitstream F by means of a decoder DEC2.

The bitstream F may have been stored locally or received from a communication network.

As explained below, the decoded residual image $\widehat{Res}$ is viewable by a traditional apparatus.

In step 54, a decoded image $\hat{I}$ is obtained by multiplying the decoded residual image $\widehat{Res}$ by the backlight image $\widehat{Ba}$.

According to an embodiment of step 14, the parameters $\hat{\gamma}$ and/or $\widehat{cst_{scaling}}$ are also obtained either from a local memory or by a at least partial decoding of the bitstream BF by means of the decoder DEC1.

According to the method, in step 52, a module ISCA applied an inverse scaling to the decoded residual image $\widehat{Res}$ by dividing the decoded residual image $\widehat{Res}$ by the parameter $\widehat{cst_{scaling}}$.

In step 53, a module ITMO applied an inverse-tone-mapping to the decoded residual image $\widehat{Res}$, by means of the parameters $\hat{\gamma}$.

For example, the parameter $\hat{\gamma}$ defines a gamma curve and the inverse-tone-mapping is just to find, from the gamma curve, the values which correspond to the pixel values of the decoded residual image $\widehat{Res}$.

The decoders DEC1, respectively DEC2, is configured to decode data which have been encoded by the encoder ENC1, respectively DEC2.

The encoders ENC1 and ENC2 (and decoders DEC1 and DEC2) are not limited to a specific encoder (decoder) but when an entropy encoder (decoder) is required, an entropy encoder such as a Huffmann coder, an arithmetic coder or a context adaptive coder like Cabac used in h264/AVC or HEVC is advantageous.

The encoders ENC1 and ENC2 (and decoders DEC1 and DEC2) are not limited to a specific encoder which may be, for example, an image/video coder with loss like JPEG, JPEG2000, MPEG2, h264/AVC or HEVC.

On FIGS. 1-5, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the invention are implemented using either pure hardware, for example using dedicated hardware such ASIC or FPGA or VLSI, respectively <<Application Specific Integrated Circuit>>, <<Field-Programmable Gate Array>>, <<Very Large Scale Integration>>, or from several integrated electronic components embedded in a device or from a blend of hardware and software components.

Figure 6:
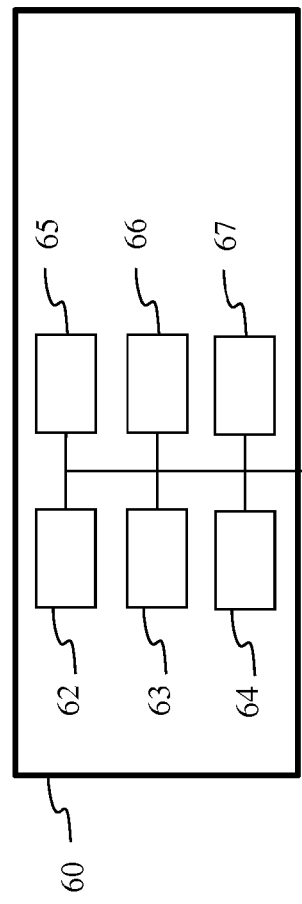
FIG. 6 shows an example of an architecture of a device in accordance with an embodiment of the invention.

FIG. 6 represents an exemplary architecture of a device 60 which may be configured to implement a method described in relation with FIGS. 1-5.

Device 60 comprises following elements that are linked together by a data and address bus 61:
- a microprocessor 62 (or CPU), which is, for example, a DSP (or Digital Signal Processor);
- a ROM (or Read Only Memory) 63;
- a RAM (or Random Access Memory) 64;
- an I/O interface 65 for reception of data to transmit, from an application; and
- a battery 66

According to a variant, the battery 66 is external to the device. Each of these elements of FIG. 6 are well-known by those skilled in the art and won't be disclosed further. In each of mentioned memory, the word <<register>> used in the specification can correspond to area of small capacity (some bits) or to very large area (e.g. a whole program or large amount of received or decoded data). ROM 63 comprises at least a program and parameters. Algorithm of the methods according to the invention is stored in the ROM 63. When switched on, the CPU 62 uploads the program in the RAM and executes the corresponding instructions.

RAM 64 comprises, in a register, the program executed by the CPU 62 and uploaded after switch on of the device 60, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to a specific embodiment of encoding or encoder, the image I is obtained from a source. For example, the source belongs to a set comprising:
- a local memory (63 or 64), e.g. a video memory or a RAM (or Random Access Memory), a flash memory, a ROM (or Read Only Memory), a hard disk;
- a storage interface (65), e.g. an interface with a mass storage, a RAM, a flash memory, a ROM, an optical disc or a magnetic support;
- a communication interface (65), e.g. a wireline interface (for example a bus interface, a wide area network interface, a local area network interface) or a wireless interface (such as a IEEE 802.11 interface or a Bluetooth® interface); and
- an image capturing circuit (e.g. a sensor such as, for example, a CCD (or Charge-Coupled Device) or CMOS (or Complementary Metal-Oxide-Semiconductor)).

According to different embodiments of the decoding or decoder, the decoded image Î is sent to a destination; specifically, the destination belongs to a set comprising:
- a local memory (63 or 64), e.g. a video memory or a RAM, a flash memory, a hard disk;
- a storage interface (65), e.g. an interface with a mass storage, a RAM, a flash memory, a ROM, an optical disc or a magnetic support;
- a communication interface (65), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and
- a display.

According to different embodiments of encoding or encoder, the bitstream BF and/or F are sent to a destination. As an example, one of bitstream F and BF or both bitstreams F and BF are stored in a local or remote memory, e.g. a video memory (64) or a RAM (64), a hard disk (63). In a variant, one or both bitstreams are sent to a storage interface (65), e.g. an interface with a mass storage, a flash memory, ROM, an optical disc or a magnetic support and/or transmitted over a communication interface (65), e.g. an interface to a point to point link, a communication bus, a point to multipoint link or a broadcast network.

According to different embodiments of decoding or decoder, the bitstream BF and/or F is obtained from a source. Exemplarily, the bitstream is read from a local memory, e.g. a video memory (64), a RAM (64), a ROM (63), a flash memory (63) or a hard disk (63). In a variant, the bitstream is received from a storage interface (65), e.g. an interface with a mass storage, a RAM, a ROM, a flash memory, an optical disc or a magnetic support and/or received from a communication interface (65), e.g. an interface to a point to point link, a bus, a point to multipoint link or a broadcast network.

According to different embodiments, device 60 being configured to implement an encoding method described in relation with FIGS. 1-4, belongs to a set comprising:
- a mobile device;
- a communication device;
- a game device;
- a tablet (or tablet computer);
- a laptop;
- a still image camera;
- a video camera;
- an encoding chip;
- a still image server; and
- a video server (e.g. a broadcast server, a video-on-demand server or a web server).

According to different embodiments, device 60 being configured to implement a decoding method described in relation with FIG. 5, belongs to a set comprising:
- a mobile device;
- a communication device;
- a game device;
- a set top box;
- a TV set;
- a tablet (or tablet computer);
- a laptop;
- a display and
- a decoding chip.

Figure 7:
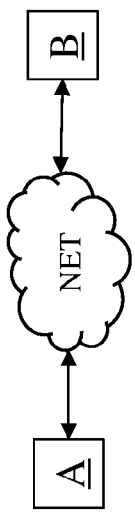
FIG. 7 shows two remote devices communicating over a communication network in accordance with an embodiment of the invention.

According to an embodiment illustrated in FIG. 7, in a transmission context between two remote devices A and B over a communication network NET, the device A comprises means which are configured to implement a method for encoding an image as described in relation with the FIG. 1 and the device B comprises means which are configured to implement a method for decoding as described in relation with FIG. 5.

According to a variant of the invention, the network is a broadcast network, adapted to broadcast still images or video images from device A to decoding devices including the device B.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. Method for encoding an image, performed in an encoder, characterized in that it comprises:
   encoding a backlight image determined from the image;
   obtaining a residual image by dividing the image by a decoded version of the backlight image;
   obtaining a tone-mapped residual image by tone-mapping the residual image; and
   encoding the tone-mapped residual image.

2. The method according to claim 1, wherein tone-mapping the residual image comprises either a gamma correction or a SLog correction according to the pixel values of the residual image.

3. The method according to claim 1, wherein obtaining the backlight image from the image comprises:
   obtaining a backlight image from a luminance component of the image; and
   modulating the backlight image with a mean luminance value of the image.

4. The method according to claim 3, wherein obtaining the backlight image from the image further comprises:
   normalizing the backlight image by its mean value before modulating the backlight image.

5. The method according to claim 1, wherein the method further comprises, before encoding, scaling the residual image by multiplying each component of the residual image by a scaling factor.

6. The method according to claim 1, wherein the method further comprises, before encoding, clipping the residual image to limit its dynamic range to a targeted dynamic range.

7. The method according to claim 1, wherein said image is obtained from a source belonging to a set comprising:
   a local memory;
   a storage interface,
   a broadcast interface;
   a communication interface; and
   an image capturing circuit.

8. The method according to claim 1, wherein the image is encoded into an encoded image, the encoded image being sent to a destination belonging to a set comprising: a local memory; a storage interface, and a communication interface.

9. Method for decoding a bitstream representing a residual image calculated by dividing an image by a backlight image, the method, performed in a decoder, comprising:
   obtaining a backlight image and a decoded residual image by a at least partially decoding of the bitstream, and
   obtaining a decoded image by multiplying the decoded residual image by the backlight image;
   characterized in that the decoded residual image is inverse-tone-mapped before multiplying the decoded residual image by the backlight image.

10. Device for encoding an image, characterized in that it comprises a processor configured to:
    encode a backlight image determined from the image;
    obtain a residual image by dividing the image by a decoded version of the backlight image,
    obtain a tone-mapped residual image by tone-mapping the residual image; and
    encode the tone-mapped residual image.

11. The device according to claim 10, wherein said device belongs to a set comprising:
    a mobile device;
    a communication device;
    a game device;
    a tablet;
    a laptop;
    a still image camera;
    a video camera;
    an encoding chip;
    a still image server; and
    a video server.

12. The device according to claim 10, wherein said device comprise means to obtain said image, belonging to a set comprising:
    a local memory;
    a storage interface,
    a broadcast interface,
    a communication interface; and
    an image capturing circuit.

13. The device according to claim 10, wherein said device comprises means to send an encoded image to a destination, which belongs to a set comprising:
    a local memory;
    a storage interface,
    a broadcast interface,
    a display and
    a communication interface.

14. Device for decoding a bitstream representing a residual image calculated by dividing an image by a backlight image, wherein it comprises a processor configured to:
    obtain a backlight image and a decoded residual image by a at least partially decoding of the bitstream, and
    obtain a decoded image by multiplying the decoded residual image by the backlight image;
    characterized in that the processor is further configured to inverse tone-map a decoded residual image before multiplying the decoded residual image by a backlight image.

15. The decoding device according to claim 14, wherein said device belongs to a set comprising:
- a mobile device;
- a communication device;
- a game device;
- a set top box;
- a TV set;
- a tablet;
- a laptop; and
- a decoding chip.

* * * * *